US007933803B1

(12) United States Patent
Nadler et al.

(10) Patent No.: US 7,933,803 B1
(45) Date of Patent: Apr. 26, 2011

(54) UNIVERSAL TAX ENGINE

(75) Inventors: Jeffrey Evan Nadler, Portland, OR (US); James Donovan Barta, Hillsboro, OR (US); Joseph Allen Blotner, Portland, OR (US); Eric Thomas Christian, Beaverton, OR (US); Carolyn Brauner Fong, Beaverton, OR (US); James Madison Seymour, Jr., Hillsboro, OR (US); Thomas William Waterhouse, Lake Oswego, OR (US); Gregory Alan Woolsey, Newberg, OR (US)

(73) Assignee: Sabrix, Inc, Lake Oswego, OR (US)

( * ) Notice: Subject to any disclaimer, the term of this patent is extended or adjusted under 35 U.S.C. 154(b) by 1930 days.

(21) Appl. No.: 10/869,812

(22) Filed: Jun. 15, 2004

Related U.S. Application Data

(60) Provisional application No. 60/480,989, filed on Jun. 23, 2003.

(51) Int. Cl.
*G06Q 20/00* (2006.01)
(52) U.S. Cl. .......................................... 705/19; 705/31
(58) Field of Classification Search .................. None
See application file for complete search history.

(56) References Cited

U.S. PATENT DOCUMENTS

| | | | | |
|---|---|---|---|---|
| 5,734,887 | A * | 3/1998 | Kingberg et al. | 707/4 |
| 5,774,872 | A | 6/1998 | Golden et al. | |
| 5,799,283 | A | 8/1998 | Fraqncisco et al. | |
| 6,108,712 | A | 8/2000 | Hayes, Jr. | |
| 6,311,165 | B1 | 10/2001 | Coutts et al. | |
| 6,885,860 | B2 * | 4/2005 | Bahl et al. | 455/414.1 |
| 6,993,502 | B1 * | 1/2006 | Gryglewicz et al. | 705/31 |
| 2002/0010665 | A1 | 1/2002 | Lefebvre et al. | |
| 2002/0052792 | A1 * | 5/2002 | Johnson et al. | 705/19 |
| 2003/0041045 | A1 * | 2/2003 | Sun | 707/1 |
| 2003/0055754 | A1 | 3/2003 | Sullivan | |
| 2003/0065949 | A1 | 4/2003 | Le | |
| 2003/0093320 | A1 * | 5/2003 | Sullivan | 705/19 |
| 2003/0101112 | A1 | 5/2003 | Gallagher | |
| 2004/0030619 | A1 * | 2/2004 | Stokes et al. | 705/31 |
| 2004/0049437 | A1 * | 3/2004 | Brikman et al. | 705/31 |

OTHER PUBLICATIONS

Kramer, James Office Action dated Jul. 22, 2005, from U.S. Appl. No. 10/037,035 (8 pages).
Kramer, James, Office Action dated Feb. 6, 2006, from U.S. Appl. No. 10/037,035 (8 pages).
Sheikh, Asfand, Office Action dated Jan. 19, 2007, from U.S. Appl. No. 10/037,035 (11 pages).

(Continued)

*Primary Examiner* — F. Zeender
*Assistant Examiner* — Luna Champagne
(74) *Attorney, Agent, or Firm* — Ater Wynne LLP

(57) ABSTRACT

This Disclosure relates to a program controlled apparatus, system, and method for determining the transactional taxes due for each item by any taxing authority worldwide. The apparatus comprises a first database comprising a tree structure identifying all of the zones to be examined. A second database comprising all of the taxing authorities is independent from the first zone database. A third database, decoupled from the first and second databases, has data representing the relationship between the data records of the first database and the data records of the second database. Each of the databases can be updated periodically to reflect any changes in identified taxing authorities for the zones over which they may have taxing authority. Furthermore, the present invention provides for an independent, autonomous determination of jurisdiction and tax for each line item and calculates the tax based on any exceptions and exemptions.

6 Claims, 11 Drawing Sheets

OTHER PUBLICATIONS

Sheikh, Asfand, Office Action dated Jan. 23, 2009, from U.S. Appl. No. 10/037,035 (11 pages).
Sheikh, Asfand, Office Action dated Mar. 4, 2010, from U.S. Appl. No. 10/037,035 (11 pages).
Vertexinc.com found at www.archive.com—archived on the internet on Apr. 22, 1995 (25 pages).
Microsoft Computer Dictionary (Jul. 22, 2005 USPTO Office Action—no further identifying information provided).
Sheikh, Asfand; Non-Final Rejection, dated Aug. 19, 2010; from U.S. Appl. No. 10/037,035 (23 pages).
Applicant's Response to Non-Final Rejection, dated Jun. 2, 2010; from U.S. Appl. No. 10/037,035 (7 pages).
Sheikh, Asfand; Interview Summary, dated Jun. 1, 2010; from U.S. Appl. No. 10/037,035 (3 pages).
Sheikh, Asfand; Non-Final Rejection, dated Mar. 4, 2010; from U.S. Appl. No. 10/037,035 (14 pages).
Applicant's Response to Notice of Non-Complaint Amendment, dated Oct. 21, 2009; from U.S. Appl. No. 10/037,035 (9 pages).
Sheikh, Asfand; Notice of Non-Complaint Amendment, dated Sep. 30, 2009; from U.S. Appl. No. 10/037,035 (3 pages).
Applicant's Request for Continued Examination, dated Jun. 17, 2009; from U.S. Appl. No. 10/037,035 (1 page).
Sheikh, Asfand; Advisory Action, dated Jun. 10, 2009; from U.S. Appl. No. 10/037,035 (3 pages).
Applicant's Response to Final Rejection, dated May 20, 2009; from U.S. Appl. No. 10/037,035 (16 pages).
Sheikh, Asfand; Final Rejection; dated Jan. 23, 2009; from U.S. Appl. No. 10/037,035 (11 pages).
Applicant's Amendment and Request for Reconsideration; dated Sep. 8, 2008; from U.S. Appl. No. 10/037,035 (15 pages).
Sheikh, Asfand; Non-Final Rejection, dated Jan. 19, 2007; from U.S. Appl. No. 10/037,035 (15 pages).
Applicant's Response and Amendment to Non-Final Rejection, dated Aug. 7, 2006; from U.S. Appl. No. 10/037,035 (13 pages).
Kramer, James A.; Final Rejection, dated Feb. 6, 2006; from U.S. Appl. No. 10/037,035 (8 pages).
Applicant's Response and Amendment to Non-Final Rejection, dated Nov. 28, 2005; from U.S. Appl. No. 10/037,035 (12 pages).
Kramer, James A.; Non-Final Rejection; dated Jul. 22, 2005; from U.S. Appl. No. 10/037,035 (33 pages).

* cited by examiner

FIG. 7A

| ZONE AUTHORITY | | |
|---|---|---|
| ZONE ID | AUTHORITY ID | PROCESSING ORDER |
| 1 | 22 | 1 |
| 2 | 29 | 1 |
| 3 | 26 | 2 |
| 3 | 27 | 1 |

FIG. 7B

| ZONE | |
|---|---|
| 1 | FRANCE |
| 2 | TEXAS |
| 3 | ARAB |

FIG. 7C

| AUTHORITY | |
|---|---|
| AUTHORITY ID | NAME |
| 22 | France |
| 29 | TX - STATE TAX |
| 26 | AL - ARAB CITY TAX |
| 27 | AL - CULLMAN COUNTY TAX |

FIG. 8A

AUTHORITY JURISDICTION DETERMINATION MAPPINGS

| AUTHORITY | METHOD |
|---|---|
| 22 | EU_JD_METHOD |
| 29 | US_STATE_JD_METHOD |
| 26 | US_CITY_JD_METHOD |
| 27 | US_COUNTY_JD_METHOD |

FIG. 8B

AUTHORITY EXCEPTION MAPPINGS

| AUTHORITY | METHOD |
|---|---|
| 22 | EU_EXCEPTION_METHOD |
| 29 | US_STATE_EXCEPTION_METHOD |
| 26 | US_CITY_EXCEPTION_METHOD |
| 27 | US_COUNTY_EXCEPTION_METHOD |

FIG. 8C

AUTHORITY CALCULATION MAPPINGS

| AUTHORITY | METHOD |
|---|---|
| 22 | EU_CALCULATION_METHOD |
| 29 | US_STATE_CALCULATION_METHOD |
| 26 | US_CITY_CALCULATION_METHOD |
| 27 | US_COUNTY_CALCULATION_METHOD |

FIG. 8E

| RATES | |
|---|---|
| RATE CODE | RATE |
| AB | 4% |
| CD | 3% |
| XY | 1% |
| ZP | 62% |

FIG. 8D

| RULES | |
|---|---|
| AUTHORITY ID | RATE CODE |
| 22 | AB |
| 26 | XY |
| 27 | ZP |

FIG. 9A (Prior Art)

| CITY TAX RATES | | | | |
|---|---|---|---|---|
| STATE | COUNTY | CITY | ZIP | CITY RATE |
| AL | CULLMAN | ARAB | 36016 | 4% |
| AL | BARBOUR | BAKER HILL | 36027 | 2% |
| AL | BARBOUR | EUFALA | 36027 | 3% |
| AL | BARBOUR | EUFALA | 36053 | 3% |
| AL | BARBOUR | CLIO | 36016 | 3% |

FIG. 9B (Prior Art)

| COUNTY TAX RATES | | | | |
|---|---|---|---|---|
| STATE | COUNTY | CITY | ZIP | COUNTY RATE |
| AL | CULLMAN | ARAB | 36016 | 3% |
| AL | BARBOUR | BAKER HILL | 36027 | 1% |
| AL | BARBOUR | EUFALA | 36027 | 1% |
| AL | BARBOUR | EUFALA | 36053 | 1% |
| AL | BARBOUR | CLIO | 36016 | 1% |

FIG. 10

```
COMPANY
   INVOICE NUMBER: 123456
   INVOICE DATE: 28 – OCT- 2006
   CUSTOMER NAME: NANETTE SIMON

LINE    ITEM        QUANTITY    PRICE
   1       CHAIR       1           149.99
   2       DESK        3           349.99
   3       CUBE WALL   4           499.99
```

1001

UNIVERSAL TAX ENGINE

CROSS REFERENCE TO RELATED APPLICATIONS

This application claims the benefit of co-pending provisional patent application Ser. No. 60/480,989 filed Jun. 23, 2003.

TECHNICAL FIELD OF THE INVENTION

The present invention is directed, in general, to an intelligent apparatus and method for transforming, analyzing, storing and reporting detailed computation of tax related data, and in particular to a system and method of generating taxes due to any taxing authority worldwide with an independent, autonomous determination of jurisdiction and tax for each authority object.

BACKGROUND OF THE INVENTION

Tax laws are complex, and ever changing. In addition, there are multiple taxing authorities that put rules and regulations in place impacting even the simplest of transactions. One consequence of doing business in many locales is an increase in the complexity of an organization's procedures designed to facilitate tax compliance. Because of political boundary variations, changing laws and regulations, new forms of products, and new business innovations, transaction taxes and tax compliance represent a substantial part of any organization's cost structure. In the United States alone, there are over 7,500 tax jurisdictions, including states, cities, counties, and subsections of cities and counties. The location of an organization's warehouses, stores, and/or customers may all impact the organization's tax obligations as it does business electronically, or via traditional "brick and mortar" mechanisms.

Transaction taxes generally relate to the transfer (i.e., the purchase or sale) of goods and/or services. Special transactional taxes may exist in various locales for certain types of goods (e.g., alcohol may be subject to an excise tax, or communications services may be subject to a telecom tax), but generally, there are three main categories of transactional taxes: turnover tax; sales and use tax; and value added tax. While all three categories of taxes represent a tax on the sale of supplies (i.e., goods and/or services), they differ in many important ways, such as how the tax is calculated and to whom the tax is owed, thereby further complicating tax compliance procedures and reporting. In addition, considerations such as exemptions, specially negotiated rates, and the like, must be taken into consideration by an organization's tax professional in order to prevent miscalculation of taxes, which may lead to overpayment, or penalties for underpayment.

In general, tax laws are created and enacted in broad strokes, such as all countries in the European Union assessing a special reduced rate for a given petroleum byproduct, or all cities in California may charge up to 1% for food stamp eligible items. However, it is often the case that individual taxing authorities create their own exceptions or enhancements to these rules. It may be that one of the EU countries only assesses tax if the seller is registered and established, and it could be that several cities in California only assess a ½ % tax for food stamp eligible items.

In order to handle such situations, previous systems and methods force users to store redundant data and implement multiple tax engines. Such systems require software updates whenever there is a change in the tax law by any taxing authority.

It would be desirable, therefore, to have a system and method of processing tax which decouples each taxing authority from the geographical regions (zones) over which they hold taxing jurisdiction, such that there would not be a need to generate large tax tables with greatly repetitive data.

In addition, it would be desirable to have a system and method of processing tax information where the addition of an authority, and/or the implementing of an authority's processing rules can be incorporated into the system merely by updating a small amount of data.

Further, it would be desirable to have a single system which handles multiple types of authorities, removing the need to maintain disparate systems.

SUMMARY OF THE INVENTION

This invention provides for the taxing authority to be identified independently from named geographical areas (a.k.a., zones) over which they hold sway. This orientation mirrors reality, in that a given taxing authority may have jurisdiction to assess tax over a number of geographical areas. Known systems make no differentiation between zones and authorities. In the present invention, authorities are mapped to zones using standard relational database normalization methods, allowing any number of authorities to be used in calculation for any number of zones. This design removes the data duplication problems that exist in known systems.

Another advantage of this invention, enabled by this data model, is that with the decoupling of the authority from the zones, an infinite number of authorities can assess tax on a given transaction, whereas known systems are limited to a finite maximum set.

A simple example is the case of Autauga County in Alabama. In this example, Autauga County is an "authority" that is legally authorized to pass its own tax laws. This authority assesses a tax on all transactions in the county over which it has jurisdiction. In addition, some (but not all) of the cities in this county also assess a separate city tax. Again, each city is therefore an authority having its own jurisdiction. The Autauga County taxing authority is stored only once in the database, and is mapped to only one zone (the Autauga County zone), and each city authority is also stored only once, and mapped to relevant city zone(s).

A slightly more complicated example is that of the Bay Area Rapid Transit special taxing district in California ("BART"). The BART taxing authority is eligible to assess tax in a handful of counties (each a zone) in California. As it happens, these counties also assess an additional county tax on all transactions in their respective counties. In such a case, these three counties will have two authorities associated with each, whereas the rest of the county zones in California will only have one.

The invention also provides for taxing authorities to operate independently of each other. In the present invention, each authority has a procedure which determines jurisdiction, determines special exceptions and enhancements, and calculates the actual tax. The procedure associated with a particular authority can be independent of all other authority procedures. In effect, each authority acts as an independent, autonomous entity, without reference to, or dependence on, other authorities. This responsibility-driven design mirrors the way the actual governmental taxing authorities operate. In one embodiment, each authority can have a completely separate procedure for performing these functions. This association between an authority and its procedure can be mapped, either in code or in data.

In reality, however, multiple authorities often share various subcomponents of these procedures. For example, most countries in the European Union only assess tax if the seller is registered and established with the authority. In such a case, the verification of registration and establishment can be shared across all authorities in the EU. Therefore, in a second embodiment, the calculation method can be decomposed into independently sharable and executable subcomponents for jurisdiction determination, exception and exemption handling, and calculation. For example, both France and Germany share the same jurisdiction determination rules, which can be captured in a single subcomponent that is shared between both authorities. Further, the subcomponents can also be individually associated with authorities through code or data.

By having each authority determine for itself if and how it will assess tax on a given transaction, the present invention is uniquely able to combine many different taxing authorities, including authorities from different parts of the world, on one transaction. In fact, it is this feature in particular that enables the present invention to perform tax calculations on U.S., non-U.S. and combination transactions—a dexterity unavailable in previous known systems. In order to use previous systems, one must purchase and interface with separate U.S. and international tax engines (Canada taxation is usually incorporated into the U.S. engines). With the present invention, companies can run transactions that ship from Paris, Texas, to Paris, France, in one system.

These two facets of independence are a major departure from previous implementations of tax calculation technology. Technologically, it is accomplished by using object-oriented techniques and relational data modeling best practices, instead of a procedural implementation or "hard coding" of tax rules, and/or denormalized data structures. The invention instantiates a line item for each authority, and interrogates the authority for information regarding taxation. Data stored in the database allows reuse of code—only one authority class (a.k.a., data type) is used, and this type, combined with data from the database relevant to the authority, enables individual authorities to have varying characteristics and attributes. This is an advancement over known systems or methods.

The system or method of the current invention enables a quick reaction to many tax law changes without the need for a new release of software. For example, on Jan. 1, 2004, all counties and cities in the state of Ohio will determine their eligibility to have jurisdiction over a transaction in the same fashion as does the state of Connecticut. The present invention can handle that change with a simple database update, rather than a re-release of software, as would be required by known systems.

The decoupling of taxing authorities from the geographical areas ("zones") over which they hold jurisdiction, and the independent, autonomous operation of taxing authorities are breakthrough concepts in tax calculation technology. Boiled down to its simplest description, the system and method of the present invention "looks like the law": the taxing authority is the linchpin of the system and performs calculation operations as appropriate to itself. Previous products in this same space create a calculator engine in which all authorities are homogenized and intermingled, often within one central procedure. In addition, previous systems and methods do not drive the procedure control flow by data, but rather use hard-coded methods.

BRIEF DESCRIPTION OF THE DRAWINGS

The invention is best understood from the following detailed description when read with the accompanying Figures. In the drawings, like reference numerals refer to like parts throughout the various views of the non-limiting and non-exhaustive embodiments of the present invention, and wherein:

FIGS. 7A-C are examples of look-up tables of the present invention;

FIGS. 8A-E are examples of look-up tables of the present invention;

FIGS. 9A-B are embodiments of prior art flat tables; and

FIG. 10 is a pictorial illustration of an example invoice.

DETAILED DESCRIPTION

Embodiments of methods, apparatus, and articles of manufacture for tax computation, management, and compliance reporting are described herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments in accordance with the teachings of the present invention provide methods, apparatus, and articles of manufacture for tax computation, management, and compliance reporting via a centralized transactional tax platform capable of incorporating transaction data and/or tax information from multiple locations and/or multiple business applications via a network architecture. In one embodiment, a central server, configured to execute an application for managing the configuration, administration, and reporting associated with global tax transactions, may be communicatively coupled to a plurality of intra-organizational client systems located throughout the world. Each of the plurality of client systems may be configured to execute one or more business applications to enable transactions or to gather information related to transactions, in an embodiment.

In one embodiment, transaction data corresponding to the transactions may be communicated to the central server via a network communication link from a calling client system. Upon receiving the transaction data, the central server may execute instructions to calculate any appropriate transaction taxes, store tax-related information corresponding to the transaction such as audit information, a record of calculation logic and output, or the like, and respond to the calling client system with an indication of the calculated transaction taxes associated with the transaction or series of transactions.

Figure 1:
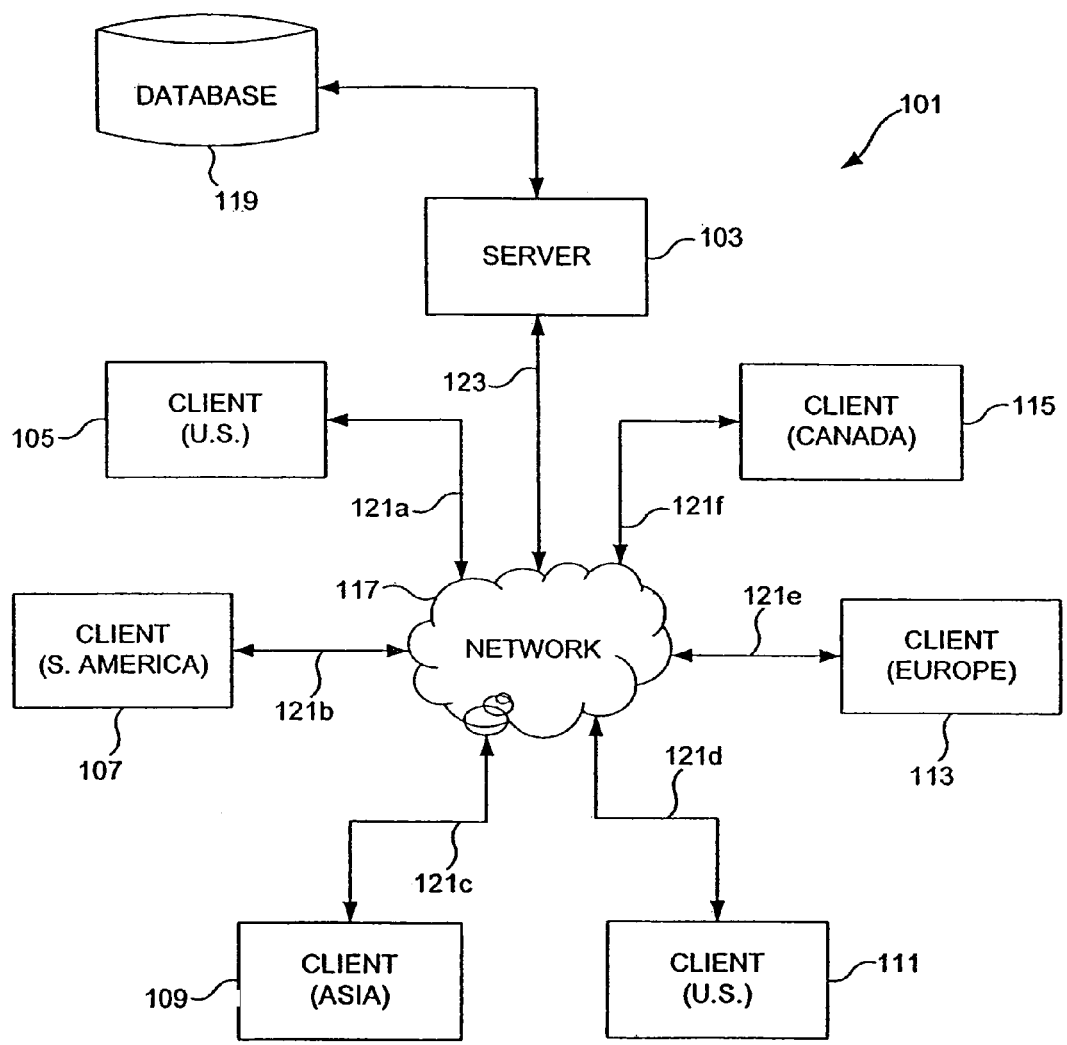
FIG. 1 is a block diagram of one embodiment of a network environment in accordance with the teachings of the present invention.

With reference now to the drawings, and in particular to FIG. 1, an embodiment of a network environment 101 is illustrated in accordance with the teachings of the present invention. In one embodiment, a server 103 may be communicatively coupled to a plurality of client systems 105, 107, 109, 111, 113, and 115 via a network 117. In one embodiment, the client systems 105-115 are capable of connecting to the network 117 via individual communication links 121a, 121b, 121c, 121d, 121e and 121f, respectively, while the server 103 is capable of connecting to the network 117 via a communication link 123.

In one embodiment, the communication links 121a-121f, and 123 may be used by the client systems 105-115, and the server 103, respectively, to send and/or receive information from one another, such as for example, but not limited to, configuration data, transaction data, and/or tax information. In one embodiment, the communication links 121a-121f, and 123 may comprise physical connections, such as for example, cables, wires, optical fibers, or the like. In another embodiment, the communication links 121a-121f, and 123 may comprise wireless links, such as for example, radio frequency ("RF") links, satellite transmissions, optical signals, or the like, transmitted through the atmosphere, or any combination of the foregoing. In one embodiment, the network 117 may be any type of communications network through which a plurality of different devices may communicate, such as for example, but not limited to, the Internet, a wide area network ("WAN"), a local area network ("LAN"), an intranet, or the like, or any combination of networks interconnected with one another.

In one embodiment, the server 103 and the plurality of client systems 105-115 may comprise elements of a single organization (also referred to herein as a "company") with physical locations throughout various parts of the world and/or the United States. For example, in the illustrated embodiment, the client systems 105 and 111 may be located at two distinct locations within the United States, while the client system 107 may be located in South America, the client system 109 may be located in Asia, the client system 113 may be located in Europe, and the client system 115 may be located in Canada. It will be appreciated that the locations of the client systems 105-115 described herein and illustrated in FIG. 1 are provided as examples only, and that the location and number of the client systems 105-115 may vary in other embodiments in accordance with the teachings of the present invention.

In one embodiment, the server 103 may be coupled to a central storage, such as a database 119, to store data such as current tax tables, computational algorithms, organization nexus and location information, customer data, product codes and cross references, as well as exceptions and exemptions to standard tax provisions within various tax jurisdictions and/or tax zones, and the like, to facilitate the calculation of transactional taxes corresponding to transactions occurring in various locales. In addition, the database 119 may store data including tax information such as audit data, compliance reports, and the like, to facilitate tax compliance within the various locales, taxing jurisdictions, or tax zones in which the transactions are taking place. In one embodiment, the database 119 may also include product information, which, in conjunction with taxing jurisdictions, may facilitate an analysis of sales data for the organization.

Figure 2:
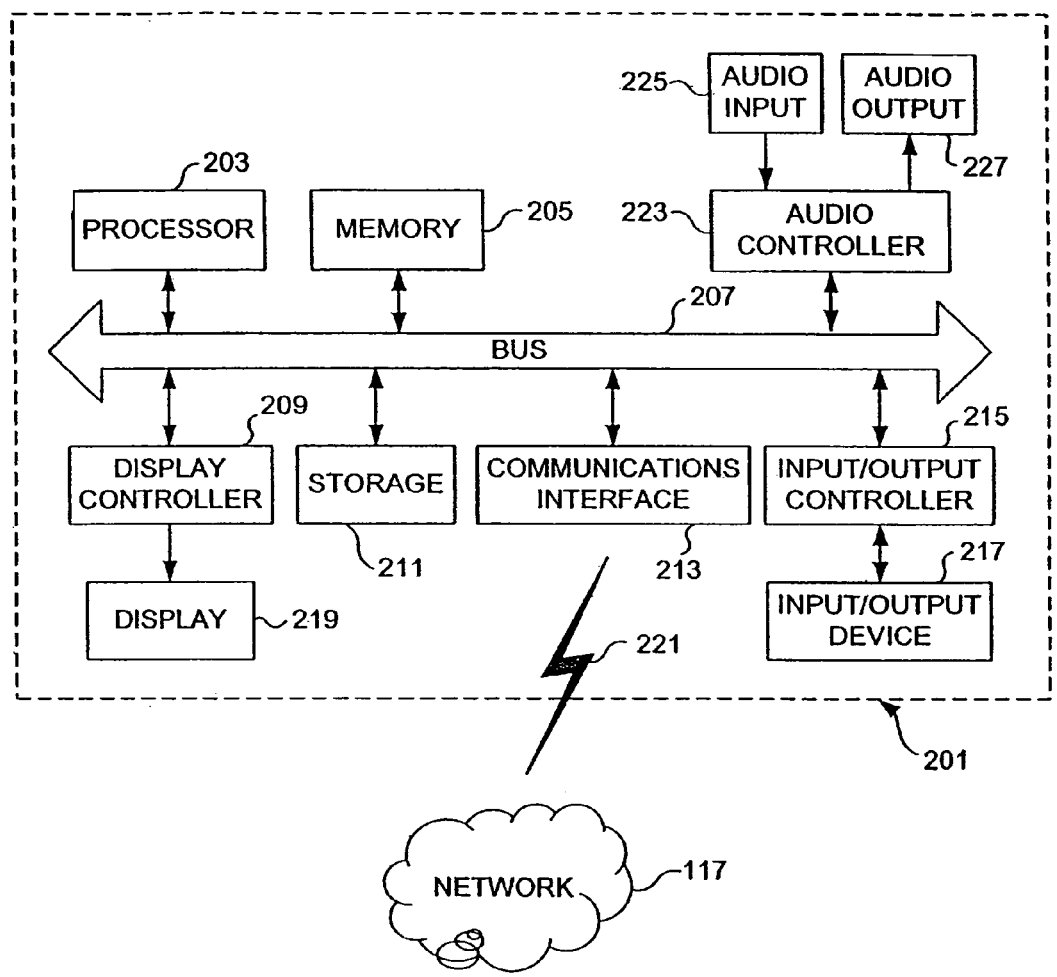
FIG. 2 is a block diagram of one embodiment of a computer system representative of a client system or a server in accordance with the teachings of the present invention.

With reference now primarily to FIG. 2, a block diagram illustrating one embodiment of a machine 201, representative of the server 103 and/or the client systems 105-115, is shown in accordance with the teachings of the present invention. Typically, the server 103 may comprise a computer server or similar type of server hardware that is designed to communicate with a plurality of other machines. The clients 105-115 may comprise various types of machines, including a desktop computer or a workstation, for example, but may also comprise a computer server or similar type of server hardware that is designed to communicate with a plurality of other machines. In one embodiment, the machine 201 is a computer that includes a processor 203 coupled to a bus 207. In one embodiment, a memory 205, a storage 211, a display controller 209, a communications interface 213, an input/output controller 215, and an audio controller 223 are also coupled to the bus 207.

In one embodiment, the machine 201 interfaces to external systems through the communications interface 213. The communications interface 213 may include a radio transceiver compatible with various modulated signals, wireless telephone signals, or the like. The communications interface 213 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC3), token ring interface, satellite transmission interface, a wireless interface, or other interfaces for coupling a device to other devices.

In one embodiment, a carrier wave signal 221 is received/transmitted between the communications interface 213 and the network 117. In one embodiment, the communications signal 221 may be used to interface the machine 201 with another computer, system, a network hub, a router, or the like. In one embodiment, the carrier wave signal 221 is considered to be machine-readable media, which may be transmitted through wires, cables, optical fibers, or through the atmosphere, or the like.

In one embodiment, the processor 203 may be a conventional processor, such as for example, but not limited to, an Intel© x86 processor, or Pentium© family microprocessor, a Motorola© family microprocessor, or the like. The memory 205 may be a machine-readable medium such as dynamic random access memory ("DRAM"), and may include static random access memory ("SRAM"). The display controller 209 controls, in a conventional manner, a display 219, which in one embodiment may be a cathode ray tube ("CRT"), a liquid crystal display ("LCD"), an active matrix display, or the like. An input/output device 217, coupled to the input/output controller 215 may be a keyboard, a disk drive, a printer, a scanner, or other input/output device, including a mouse, a trackball, a trackpad, a joystick, or the like.

A significant component of any transaction tax determination is the location of the parties involved in the transaction. In the United States, each transaction must include information regarding each of four locations: a ship from location; a point of order origin ("POO") location; a point of order acceptance ("POA") location; and a ship to location. The ship from location generally refers to a location from which goods are being shipped, or a location at which services are being performed, for example a warehouse or a store. The POO location generally refers to a location at which an order for the goods or services is placed, for example a store or a trade show. The POA location generally refers to a location at which the order for the goods or services is accepted, for example a call center where an order was placed. The ship to location generally refers to a location at which a customer receives the goods or services that were purchased, for example the customer's business or home. Other jurisdictions may require more, or less location information.

Turning now to FIG. 9A and FIG. 9B, there are shown flat databases as are known in the art where the authority and zones are coupled together. Such a database couples the authority directly to the zone and the tax rule and the tax rate. Such flat databases have the known problems of repetitions of the same data for each combination and permutation of these variables (authority, zone, rate, etc.). For example, note in FIG. 9B that the county of BARBOR is represented multiple times, but with the same tax rate.

Figure 4:
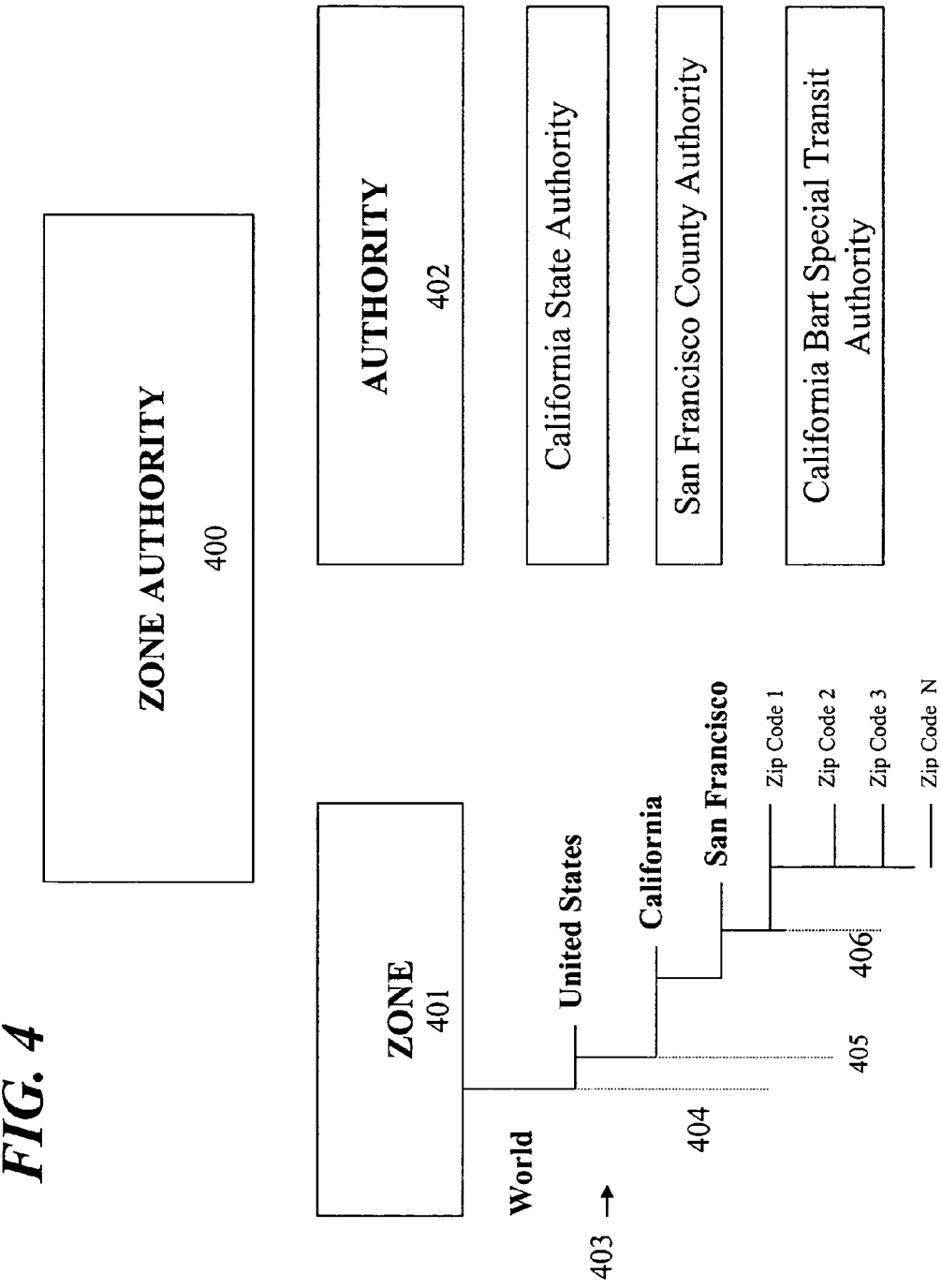
FIG. 4 is an embodiment of the present invention depicting the decoupling of zones and authorities.

Turning to FIG. 4, there is shown according to the present invention a zone authority 400 having a zone 401 decoupled from authority 402. As used herein, "zone" is any geopolitical boundary of a physical location in the world. It may or may not have a corresponding taxing authority associated with it.

Geopolitical regions can be organized into hierarchical tree structures based on geopolitical boundaries. While zone tree 403 is an essential element of this invention, the generation of zone tree 403 can be developed by one skilled in the art of computer science, with knowledge of the zones that are to be formed into a tree. It is left to one skilled in the art to determine how many levels the tree will have and how the political areas or zones are to be defined.

As shown in the embodiment of FIG. 4, zone 401 shows the World defined with four levels, shown here by way of example, with the levels defined as United States (Country), California (State), San Francisco (City), and zip codes providing the level of detail. As indicated by dashed line 404, other branches of the tree could be shown for continents such as Europe, Asia, Africa, or countries such as Mexico, France, or Germany. Dashed line 405 could be any or all of the 50 states and dashed line 406 could be any of the cities, counties, municipalities, or other tax entities within California. The extent of the tree is not limited by this invention. In fact, this invention allows the zone tree to be expanded to cover any number of levels as meets the needs of the party that implements the zone tree.

Authority 402 can be any organization authorized or capable of assessing taxes. This authority table can be as extensive as the user wishes. Shown by way of example and not of limitation three authorities, the California State Authority, the San Francisco County Authority, and the California BART Special Transit Authority, are shown. The user is free to define and establish a table of any number of authorities. Since the present invention is to decouple authority 402 from zone 401, the present invention provides for great flexibility in the method and system of calculating tax consequences of a commercial transaction as will be explained below in greater detail.

Figure 3:
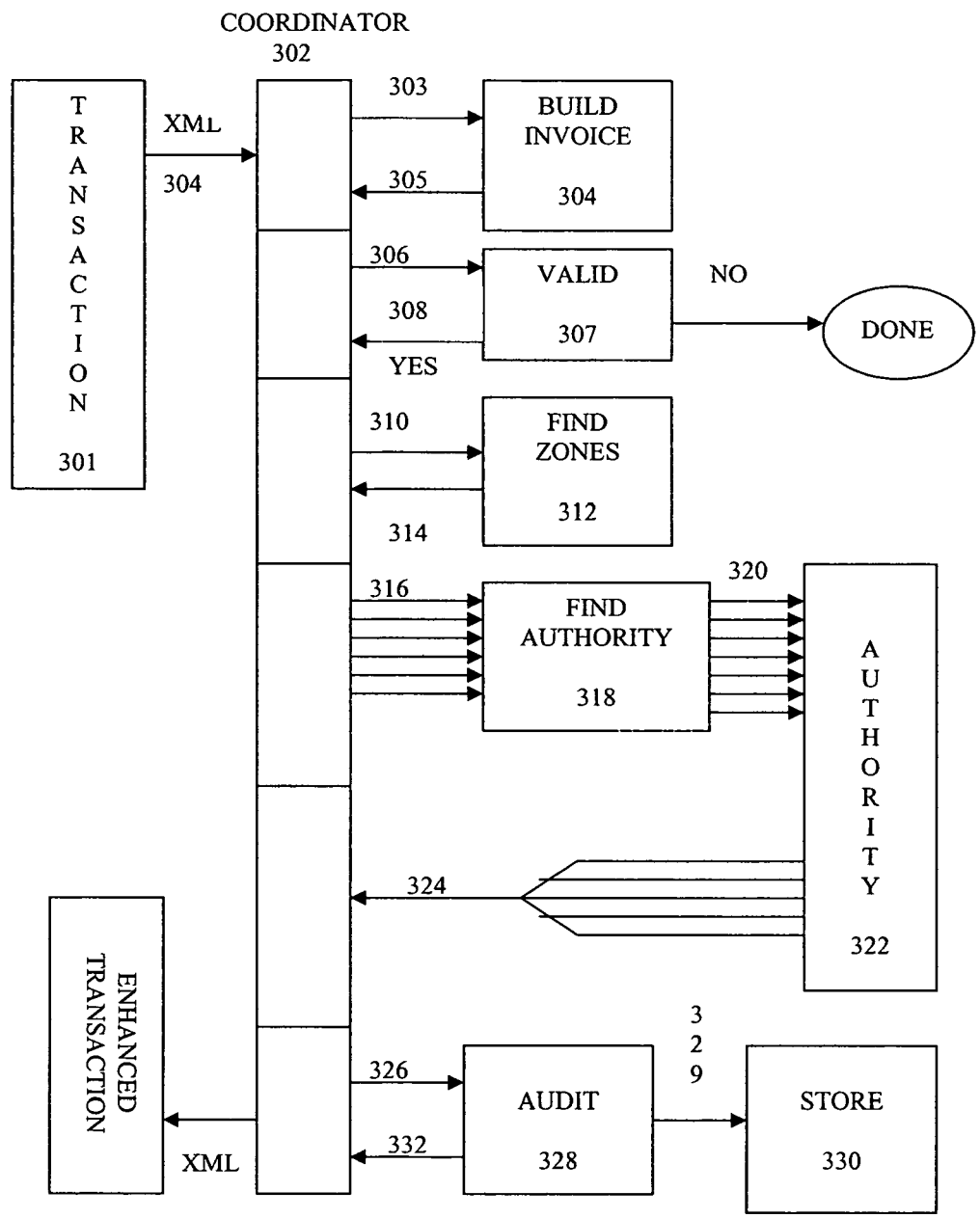
FIG. 3 is a schematic of the present invention.

With reference to FIG. 3, there is shown a representative transaction of the present invention. A user-generated transaction 301 is communicated 304 to a coordinator 302. Transaction 301 is not limited to any particular format, but the format by way of example is shown as an XML document communicated by HTTP or HTTPS to the coordinator 302. The transaction by way of example is an invoice having at least one item that has experienced or is to experience a commercial transaction. Each line item represents an object that may be any item placed in commerce. As shown in FIG. 10, an exemplary transaction is an invoice 101 with one object per line (or line item) such as a chair, a desk, and a cube wall.

The XML document is communicated 303 to block 304 "BUILD INVOICE" where the XML is converted to a new format of line items which is communicated 305 back to the coordinator 302. The line item is then communicated 306 to, and processed in, block 307 to determine if each line item is valid. If the line item is invalid, for example, if the data is not recognized, or has incorrect information entered, that line item is unable to be processed, and processing of that line item is done. Such a line item is marked as invalid. For all valid line items, the line item is communicated 308 back to the coordinator for additional processing by the system or method to generate a correct list of zones associated with an address for each line item.

Coordinator 302 communicates 310 the line item to block 312 "FIND ZONES" where for each line item an operation is performed to identify zones associated with that line item. The results are then communicated 314 back to coordinator 302. Each line item is then communicated 316 from coordinator 302 to block 318 "FIND AUTHORITY" which determines which authority, if any, is associated with the zones that were identified in block 312. The result is then communicated 320 to block 322 "AUTHORITY" where the independent, autonomous determination of jurisdiction and tax is calculated for each authority object. In AUTHORITY 322, steps are taken to look-up the appropriate jurisdiction method to determine if the authority has the jurisdiction to tax the line item and if so the appropriate exceptions and exemptions if any are looked up and applied to the transaction. Current tax rules are looked up and appropriate tax rates are looked up and then applied to the line item. The results of the AUTHORITY 322 are communicated 324 back to coordinator 302. Coordinator 302 communicates 326 the calculated tax results to AUDIT box 328. AUDIT box 328 sends a copy to STORAGE 330 and communicates 332 back to coordinator 302 the tax results which are then converted to an XML document (if that is the chosen method of communication) to send out an enhanced transaction that includes all the tax calculations that have been taken into account, all of the current tax rate rules, exceptions, and rates for each line item examined.

Figure 5:
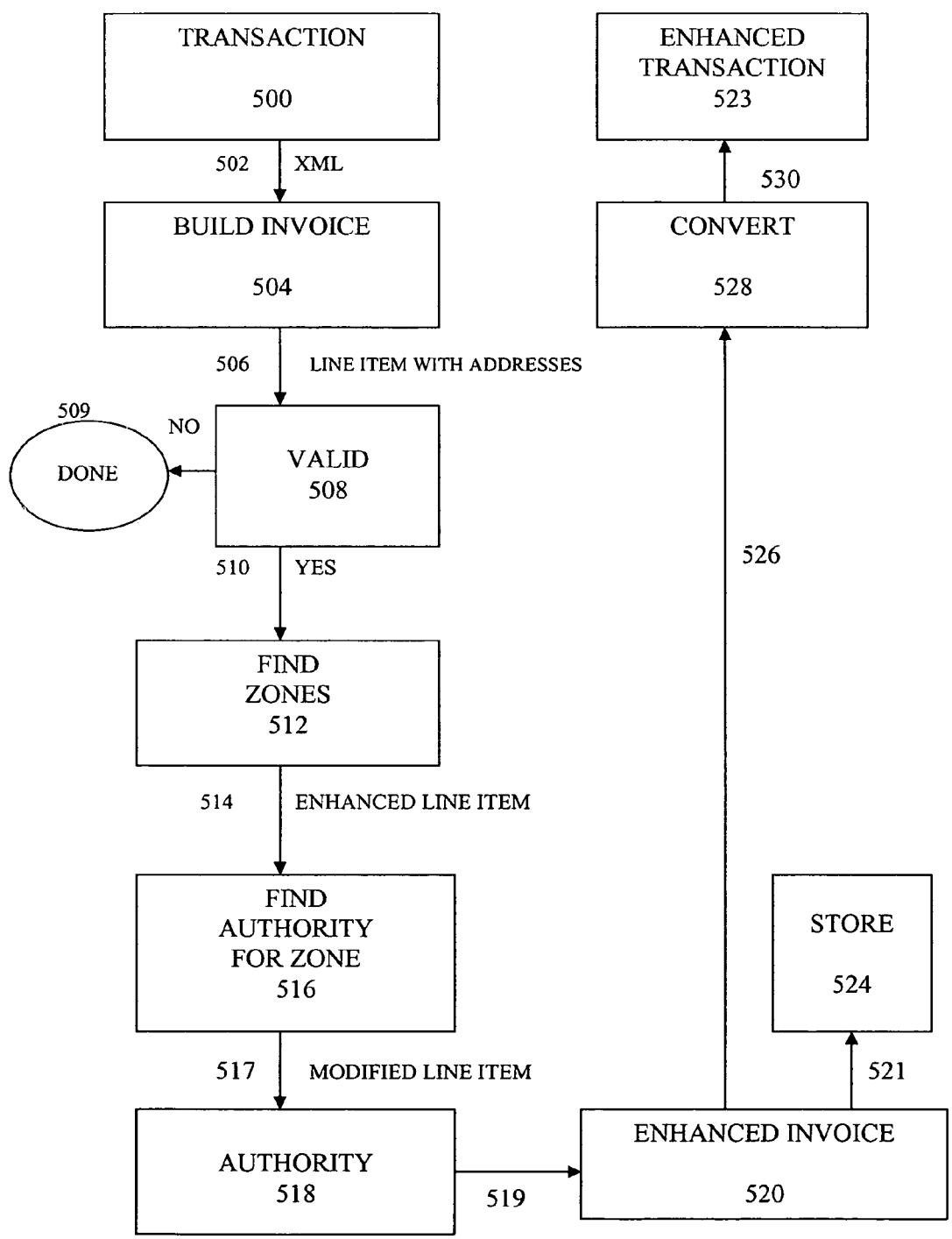
FIG. 5 is a flow chart of the method and system of the present invention.

Turning now to FIG. 5, there is shown transaction 500 which by way of example is the same XML document of FIG. 3. The invention of FIG. 3 is depicted in FIG. 5 as a flow chart to explain the steps of an exemplary implementation.

Transaction 500 is communicated 502 to block 504 where the XML structure is removed and is converted into an invoice. The output from block 504 is at least one line item having an address associated with it ("LINE ITEM WITH ADDRESSES") that is communicated 506 to block 508 where each line item of the invoice is validated. If the LINE ITEM WITH ADDRESSES is valid, it will be communicated over connection 510 to block 512 where the appropriate zones will be identified based on the line item addresses. If the LINE ITEM WITH ADDRESSES is invalid, block 508 will return an invalid signal 509.

Block 512 is the "FIND ZONES" operation that will perform an operation to associate a zone or zones for each LINE ITEM WITH ADDRESSES. By way of example, the operation to associate a zone is preferably done by use of a look-up table that identifies in a relational database the correspondence of addresses with zones.

Once the zones have been identified in block 512, the line item is converted to an ENHANCED LINE ITEM that is communicated 514 to block 516 ("FIND AUTHORITIES FOR ZONE"). Using the zone information in block 516 the authorities associated with the zone are identified to produce a MODIFIED LINE ITEM. By way of example, the operation to associate the authorities with the zone is preferably done by use of a look-up table that identifies in a relational database the correspondence of authorities with zones.

Having associated the zones and the authority, the MODIFIED LINE ITEM is communicated 517 to block 518 where the information is processed to determine jurisdiction, to find any exceptions, to find tax rules, to apply tax rules, and to apply the tax rates associated with the tax rules. This step of applying the tax rules can be done by any computation engine known to those skilled in the art. The result from block 518 is communicated 519 to block 520 where it is processed to produce AN ENHANCED INVOICE 520. The ENHANCED INVOICE LINE ITEM 520 is then communicated 521 to be stored in block 524. ENHANCED INVOICE 520 is also communicated 526 to block 528 where it is converted back to a form for transmission, such as to an XML document. The output of block 528 is communicated 530 to the designated destination as an ENHANCED TRANSACTION 532 that contains all of the appropriate tax calculations.

Figure 6:
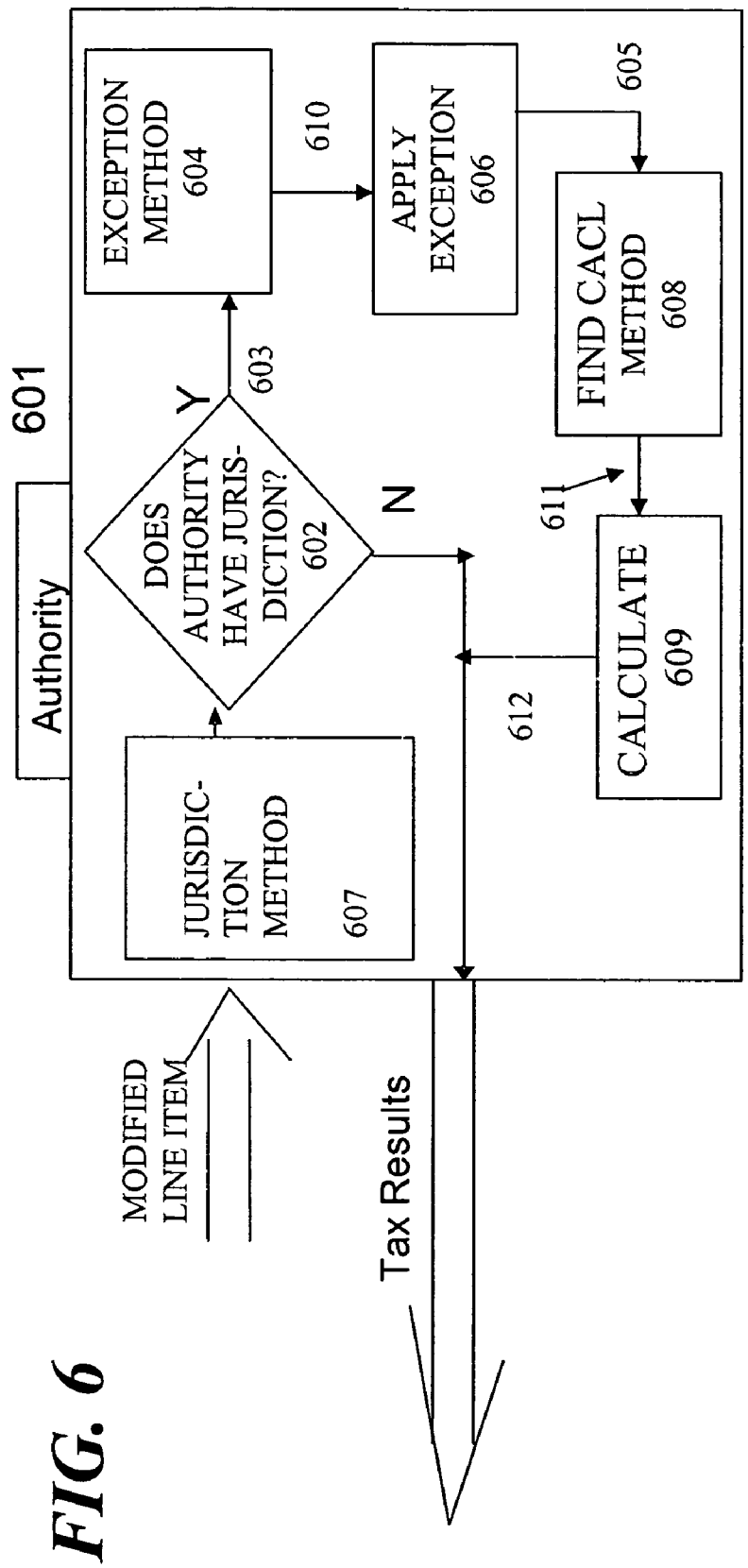
FIG. 6 is an embodiment of the present invention for the independent, autonomous authority methods.

Turning now to FIG. 6, there is shown an additional embodiment in which the subcomponents of the AUTHORITY function are displayed in detail. FIG. 6 shows the details of the present invention that take place in block 322 of FIG. 3 and block 518 in FIG. 5.

As shown in FIG. 6, a MODIFIED LINE ITEM is communicated to box 601 where it is processed to find the appropriate jurisdiction determination method in block 607. Block 607 identifies the correct method by mapping data, such as for example, using a look-up table like the one depicted in FIG. 8A. With the identified method, the modified information is communicated to block 602 to determine jurisdiction eligibility. The output is a jurisdictional result that is communicated 603 to box 604 to evaluate exceptions and exemptions. The EXCEPTION METHOD block 604 is mapped in this embodiment by use of a look-up table like the one depicted in FIG. 8B. The exception method is communicated 610 to be run in block 606 "APPLY EXCEPTION" and the processed data is then communicated 605 to block 608 "FIND CALC METHOD" where the appropriate tax calculation method is looked up in a table like the one depicted in FIG. 8C. The tax calculation is then communicated 611 to and performed in block 609 "CALCULATE" The calculation is performed by any means known in the industry, such as a computation engine that performs the necessary computation to apply the tax rate to the line item. The result is then communicated 612 to the next step, which corresponds to 519 as is shown in FIG. 5.

Looking now at FIGS. 7A-7C, there are shown sample tables of an exemplary way to implement some of the steps of the present invention that have been shown in a more general implementation in FIG. 3, FIG. 5, and FIG. 6. By way of example, as shown in FIG. 7B, ZONE ID 1 is identified as FRANCE, ZONE ID 2 is identified as TEXAS, and ZONE ID 3 is identified as ARAB in a look-up table. These names (FRANCE, TEXAS, ARAB) are names of geographic areas or zones. There is no limit to the number of zones that can be identified and entered into the zone table shown in FIG. 7B.

A separate table, FIG. 7C identifies authorities by the names France, TX-STATE TAX, AL-ARAB CITY TAX, and AL-CULLMAN COUNTY TAX, each of which is associated with a corresponding authority ID. These names are representative of any legal entity having the power to assess taxes. Again, this table is not limited in the number of authorities, as the authority table is not coupled to the zone table.

Once the information coming through as a LINE ITEM WITH ADDRESSES (see FIG. 5) is communicated to block 512, the address is used to identify the applicable zone. Assuming for example that a LINE ITEM WITH ADDRESSES is identified by its address as being subject to zone ARAB, block 512 would look-up and identify ZONE ID 3 (see FIG. 7B) as the appropriate zone. In step 516 a look-up in the ZONE AUTHORITY table (FIG. 7A) would find that ZONE ID 3 has been identified two times, by AUTHORITY ID 26 and AUTHORITY ID 27. While shown having two AUTHORITY IDs, there is in fact no limit to the number of authorities that may have assessed taxes on a particular zone.

As shown in FIG. 7A, AUTHORITY ID 27 has been assigned a processing order of 1, meaning it should be processed first, and AUTHORITY ID 26 has been assigned a processing order 2, which means that it goes second. If additional AUTHORITY IDs were identified in this step, they would each be assigned a processing order and each would in turn be processed according to that order.

Starting with AUTHORITY ID 27, with processing order 1, we start at block 601 of FIG. 6. The jurisdiction eligibility determination method is looked up in block 607, using the table in FIG. 8A. The modified data is then processed in block 602 for jurisdictional eligibility determination by the jurisdiction determination method US_COUNTY_JD_METHOD that corresponds to AUTHORITY 27. In FIG. 8B, AUTHORITY 27 is mapped to US_COUNTY_EXCEPTION METHOD that determines if there are any exceptions to the jurisdiction. In this example, this method determines that AUTHORITY 27 mapped to AL-CULLMAN COUNTY TAX (see FIG. 7C) does not have jurisdiction over the transaction and processing for this authority is complete.

The second AUTHORITY ID 26, with the processing order 2 (see FIG. 7A), which corresponds to AUTHORITY AL-ARAB CITY TAX (see FIG. 7C), is processed next. As before, block 607 looks up the jurisdiction eligibility method in a table like the one shown in FIG. 8A. Next, because AUTHORITY ID 26 has a valid jurisdictional eligibility evaluation, the authority goes to the next step 603 to evaluate exemptions and exceptions. Once block 604 has determined the exemption method to apply, it proceeds to 606 to apply the method to the transaction. When 606 is complete, the enhanced line item is communicated 605 to block 608, where the tax calculation method is looked up. The method is then applied to the line item in block 609.

The flexibility of the present invention is the ability to fill out the tables shown in FIGS. 7A-7C and FIGS. 8A-E with new data such as authorities, zones, tax laws, tax rules, or tax rate changes. Updated data can be loaded into the tables by any known means, but would preferably be downloaded over a network to those in need of an update. It is this independent, autonomous determination of jurisdiction and tax by each authority line item that overcomes the limitations of the prior art and produces beneficial new systems and methods for calculating taxes on any item in commerce worldwide.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

We claim:

1. An improved tax calculating device for calculating the tax on a transaction with at least one line item, comprising:

a table of zones representing at least one zone, the table of zones being a tree structure having more than one level, and wherein the table of zones is configured as computer-readable code stored at a computer-readable medium;

zone associating means configured as computer-executable instructions stored at a computer-readable medium, and further configured, when executed on a computer, to associate a zone with an address from the line item;

a table of authorities decoupled from said table of zones, the table of authorities representing at least one authority and being configured as computer-readable code stored at a computer-readable medium;

a zone authority table associating the zone with an authority and being configured as computer-readable code stored at a computer-readable medium;

authority associating means configured as computer-executable instructions stored at a computer-readable medium, and further configured, when executed on a computer, to associate at least one authority with the zone;

a table of jurisdiction method mapping associating the authority with a jurisdiction method and being configured as computer-readable code stored at a computer-readable medium;

jurisdiction method applying means configured as computer-executable instructions stored at a computer-readable medium, and further configured, when executed on a computer, to associate the authority to the jurisdiction method authority;

verifying means configured as computer-executable instructions stored at a computer-readable medium, and further configured, when executed on a computer, to verify that the authority associated with the zone has jurisdiction over the transaction;

a table of authority exceptions associating the authority with an exception method and being configured as computer-readable code stored at a computer-readable medium;

exception method identifying means configured as computer-executable instructions stared at a computer-readable medium, and further configured, when executed on a computer, to identify if an exception method is to be applied to the line item;

exception method applying means configured as computer-executable instructions stored at a computer-readable medium, and further configured, when executed on a computer, to apply the exception method associated with the authority to the line item;

a table of tax rules associating the authority with a tax rule and being configured as computer-readable code stored at a computer-readable medium;

tax rule applying means configured as computer-executable instructions stored at a computer-readable medium, and further configured, when executed on a computer, to use the authority to apply the tax rule to the transaction;

a table of tax rates associating the authority with a tax rate configured as computer-readable code stored at a computer-readable medium;

tax rate identifying means configured as computer-executable instructions stored at a computer-readable medium, and further configured, when executed on a computer, to identify the tax rate to apply to the line item using the identified tax rule; and calculating means configured as computer-executable instructions stored at a computer-readable medium, and further configured, when executed on a computer, to calculate taxes due on the line item based on the identified tax rate.

2. The improved tax calculating device of claim 1 further including:
a controller for receiving an input representing, the transaction.

3. The improved tax calculating device of claim 2 further including:
storing means configured to store the calculated taxes and further configured as a computer-readable medium; and
means configured for, when executed on a computer, converting the line item with the calculated taxes to an enhanced transaction for outputting to as designated receiver, the line item-converting means being further configured as computer-executable instructions stored at a computer-readable medium.

4. The improved tax calculating device of claim 1 wherein the zone authority table further includes a processing order indicator associated with the authority and configured as computer-readable code stored at a computer-readable medium, and wherein the processing order indicator is further configured, when read by a computer, to indicate the order in which each authority is processed in the tax calculating device.

5. The improved tax calculating device of claim 1 wherein said table of authorities represents authorities from more than two countries.

6. The improved tax calculating device of claim 5 wherein each authority is processed independently of any other authority.

* * * * *

UNITED STATES PATENT AND TRADEMARK OFFICE
CERTIFICATE OF CORRECTION

| | |
|---|---|
| PATENT NO. | : 7,933,803 B1 |
| APPLICATION NO. | : 10/869812 |
| DATED | : April 26, 2011 |
| INVENTOR(S) | : Nadler et al. |

It is certified that error appears in the above-identified patent and that said Letters Patent is hereby corrected as shown below:

Column 11, line 41, "stared" should be changed to --stored--.

Column 12, lines 23 to 24, "a controller for receiving an input representing, the transaction" should be changed to --a controller for receiving an input representing the transaction--.

Signed and Sealed this
Twenty-sixth Day of July, 2011

David J. Kappos
*Director of the United States Patent and Trademark Office*